US006631648B2

(12) United States Patent
Lal et al.

(10) Patent No.: US 6,631,648 B2
(45) Date of Patent: Oct. 14, 2003

(54) MICROFLUIDIC FLOW SENSING METHOD AND APPARATUS

(75) Inventors: Amit Lal, Madison, WI (US); Harun Solak, Brugg (CH); Shankar Radhakrishnan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/941,149

(22) Filed: Aug. 28, 2001

(65) Prior Publication Data

US 2003/0074983 A1 Apr. 24, 2003

(51) Int. Cl.⁷ ................................................ G01F 1/28
(52) U.S. Cl. .................................................... 73/861.71
(58) Field of Search ........................ 73/861.71, 861.74, 73/861.73, 861.24

(56) References Cited

U.S. PATENT DOCUMENTS

| 4,003,255 A | * | 1/1977 | Spencer | 73/861.71 |
| 4,522,072 A | * | 6/1985 | Sulouff et al. | 73/862.623 |
| 5,189,918 A | * | 3/1993 | Etienne et al. | 73/861.75 |
| 5,663,508 A | * | 9/1997 | Sparks | 73/861.71 |
| 6,212,958 B1 | * | 4/2001 | Conley | 73/861.74 |

OTHER PUBLICATIONS

V. Gass, et al., "Nanofluid Handling by Micro–Flow–Sensor Based on Drag Force Measurements," IEEE Micro Electro Mechanical Systems Conf., Fort Lauderdale, Florida, 1993, pp. 167–172.
Niklas Svedin, et al., "A New Silicon Gas–Flow Sensor Based on Lift Force," J. of Microelectromechanical Systems, vol. 7, No. 3, Sep. 1998, pp. 303–308.
Jae–Tack Jeong, "Two–Dimensional Stokes Flow through a Slit in a Vertical Plate on a Plane Wall," J. of Physical Society of Japan, vol. 67, No. 12, Dec. 1998, pp. 4074–4079.
R. Philip–Chandy, et al., "The design, development and performance characteristics of a fibre optic drag–force flow sensor," Meas. Sci. Technol., No. 11, 2000, pp. N31–N35.

* cited by examiner

Primary Examiner—Edward Lefkowitz
Assistant Examiner—Takisha S Miller
(74) Attorney, Agent, or Firm—Foley & Lardner

(57) ABSTRACT

Sensing of microfluidic flow is carried out by confining and directing a fluid along a surface in a primary direction of flow past a cantilever beam which is mounted at one end of the beam to the surface. The cantilever beam has opposite beam surfaces that are oriented at an angle off parallel to the primary direction of flow of the fluid. As the fluid is directed past the beam at a rate such that the drag forces imposed by the fluid on the opposite surfaces of the beam are greater than the inertial forces of the fluid on the beam, a differential force is applied to the beam that tends to pivot the beam about its mount to the surface or bend the beam or both. The deflection of the beam in response to the differential drag forces may be detected to determine the rate of flow of the fluid.

34 Claims, 5 Drawing Sheets

MICROFLUIDIC FLOW SENSING METHOD AND APPARATUS

REFERENCE TO GOVERNMENT RIGHTS

This invention was made with United States government support awarded by the following agency: DOD AF30602-00-2-0572. The United States government has certain rights in this invention.

FIELD OF THE INVENTION

This invention pertains generally to the field of microfluidic systems and particularly to flow sensors for such systems.

BACKGROUND OF THE INVENTION

There are many applications where it is necessary or desirable to manipulate fluids in small volumes, including rapid bioassays, microchemical reactions, and chemical and biological sensing. See, e.g., M. Freemantle, "Down Sizing Chemistry," Chem. & Eng. News, Vol. 77, No. 8, 1999, pp. 27–36. Microfluidic devices which can manipulate fluids at small scales have been formed using lithographic techniques similar to those used in microelectronic processing, often with crystalline silicon as the substrate on which the devices are formed. The microfluid flow channels that are formed in or on such substrates may have relatively small dimensions, e.g., channel widths of 1,000 $\mu$m or smaller.

For many applications, it is necessary to measure the rate of flow in the microchannels to properly operate the microfluidic device. Not surprisingly, the design challenge of producing flow sensors which are both accurate and economical at such dimensions is formidable. One approach to the sensing of flow rates in a closed microfluidic channel is to utilize pressure sensors embedded in the walls of the channel at either end of the channel; the differential in the pressure at the two sensors is used to determine the flow rate. Such an approach has several disadvantages. It requires an especially microfabricated channel or channel cap, which can be difficult and expensive to make. In addition, it is generally difficult to accurately calibrate the pressure sensors to obtain a good reading. Further, such an approach is limited to fully enclosed channels through which the fluid flows under pressure. The typical membrane type pressure sensors formed on the walls of the microfluidic channels generally require significant additional processing steps beyond that required to produce the flow channels themselves, and the cover that extends over the substrate to close the channel typically must be micromachined to allow integration of the sensor. Another approach to flow sensing in microchannels has utilized lift forces for sensing gas flow at moderately high Reynolds numbers. See Nikalas Svedin, et al., "A New Silicon Gas Flow Sensor Based on Lift-Force," JMEMS, Vol. 7, No. 3, 1988, pp. 303–308. However, such devices are not well suited for sensing fluid flow in smaller microfluidic channels and at lower Reynolds number flow.

SUMMARY OF THE INVENTION

In accordance with the present invention, sensing of microfluidic flow is carried out by confining and directing a fluid along a surface in a primary direction of flow past a cantilever beam which is mounted at one end of the beam to the surface. The cantilever beam has opposite beam surfaces that are oriented at an angle off parallel to the primary direction of flow of the fluid. As the fluid is directed past the beam at a rate such that the drag forces imposed by the fluid on the opposite surfaces of the beam are greater than the inertial forces of the fluid on the beam, a differential force is applied to the beam that tends to pivot the beam about its mount to the surface or bend the beam, or both. The differential drag forces apply a net force to the beam to deflect it in a direction further away from a parallel to the primary direction of flow, i.e., deflection toward an upstream direction of the flowing fluid, rather than in a direction toward the parallel to the primary direction of flow (deflection in a downstream direction), as would be the case with a beam oriented off axis in a flowing stream under flow conditions that are typically encountered in the normal macro-world where inertial forces typically dominate drag forces. However, in accordance with the present invention, the flow rates and viscosity of the fluid flowing through relatively small channels, e.g., with lateral dimensions of 500 $\mu$m or less, result in drag forces dominating, making such devices well suited for microfluidic flow sensing applications. The deflection of the beam in response to the differential drag forces imposed by the flowing fluid may then be detected to determine the rate of flow of the fluid.

Microfluidic flow sensing apparatus in accordance with the invention may include a substrate having a channel formed therein defined by side walls and a bottom wall, and a cover on the substrate enclosing the channel and defining a top wall for the channel. The channel is formed to guide flow of a fluid therethrough in a primary direction of flow. An elongated beam having preferably parallel opposite surfaces is cantilever mounted at one end of the beam to a wall of the channel, and contained within the channel, with the surfaces of the beam oriented at an angle off of parallel to the primary direction of flow of fluid in the channel. Various means may be provided for detecting deflection of the beam in the channel in response to differential drag forces on the beam imposed by fluid flowing through the channel in the primary direction of flow. These include strain sensors formed in the wall of the channel to which the beam is mounted to sense strain in the wall caused by pivoting of the beam, photodiodes formed in the wall of the channel to which the beam is mounted at, a position beneath a portion of the beam such that the beam partially blocks light incident on the photodiodes and blocks more or less light as the beam is deflected, and an optical observation system projecting light through the cover and optically detecting deflections of the beam. Such detection means are by way of example only and any other type of detector which can detect deflection of a beam may also be utilized. The cover that is mounted to the substrate to close the channel may be formed of any of a variety of materials, including polymers, since the cover does not need to be micromachined in order to accommodate the microbeam mounted within the channel. If desired, the sensing structure can be formed on a single chip by an IC manufacturer specializing in microelectronic integration, and the cover can be formed by a microfluidic foundry specializing in fabricating plastic or elastomeric parts. Typical dimensions for the channel include a height and width of less than 1,000 $\mu$m, preferably from 1 $\mu$m to 500 $\mu$m, a thickness of the beam less than 200 $\mu$m, and a length of the beam generally at least 10 times the thickness of the beam. The substrate in which or on which the channel is formed may be various materials, including crystalline silicon, which may be machined or patterned with flow paths using well developed micromachining and patterning techniques.

Further objects, features and advantages of the invention will be apparent from the following detailed description when taken in conjunction with the accompanying drawings.

DETAILED DESCRIPTION OF THE INVENTION

Figure 1:
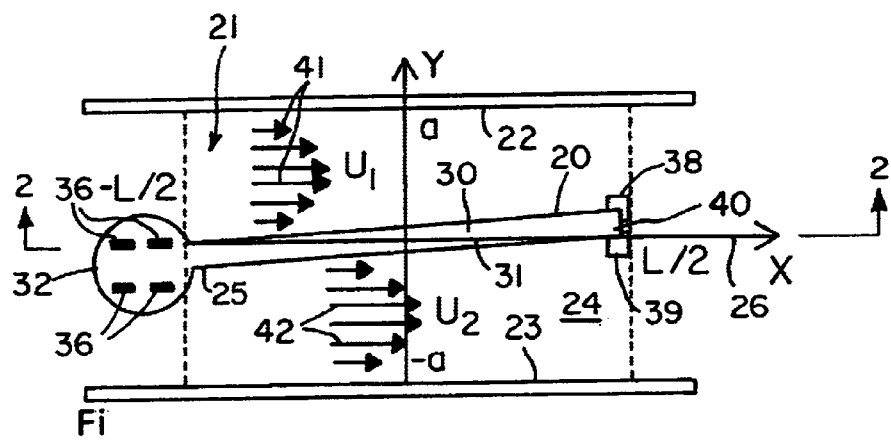
FIG. 1 is a top view of a microfluidic flow sensing apparatus in accordance with the invention.

The present invention utilizes the differential drag forces that are applied to a cantilever beam member mounted off parallel to the primary direction of flow of a fluid in laminar flow at relatively low velocities and low Reynolds numbers. The invention may be utilized with fluids used in microfluidic applications, including liquids and gases. By way of simple example only, the fluid may be water or a water based solution. To illustrate the principles of the invention, a simplified view of the apparatus of the invention is shown in FIG. 1. The apparatus includes a beam 20 mounted within a channel 21 having side walls 22 and 23 and a bottom wall 24. The beam 20 is mounted to the bottom wall, preferably at one end of the beam as illustrated at 25 in FIG. 1, at an angle (slope=m) to a parallel to the primary direction of flow (indicated by the line 26 in FIG. 1). The beam 20 divides the channel into two parts. For small beam and channel dimensions and low Reynolds number flow, inertial forces are negligible compared to the viscous forces applied by the flowing fluid. The flow is thus governed by the Stokes equation. The beam 20 divides the channel into two volumetric flows $U_1$ and $U_2$ in the two parts of the channel, as illustrated schematically in FIG. 1. These flows can be approximated as parabolic at a distance of two to three channel widths. For reference to flow under such conditions, see, Paul A. Longwell, *Mechanics of Fluid Flow* (Book), McGraw Hill, New York, N.Y., 1996, Description: xv, p. 433. See also, Jae Tack Jeong, "Two-Dimensional Stokes Flow Through a Slit in a Vertical Plate on a Plane Wall," J. of the Physical Society of Japan, Vol. 67, No. 12, December, 1998, pp. 4074–4079. Such flow conditions may be obtained with various channel dimensions. Preferred lateral dimensions of the flow channel (e.g., the width of the channel between the walls 22 and 23 of FIG. 1) are in the range of 500 μm or less. The beam 20 is appropriately sized to fit within the channel. The flow past the beam 20 causes differential drag forces on the two sides of the beam, resulting in a bending moment in the beam. If the height of the beam is equal to the height of the channel, no leakage of fluid occurs between the two parts of the channel. In the more practical case, the leakage flow is accounted for by flow between parallel plates. The pressure gradients on the two sides of the beam 20, which in this case has opposite parallel surfaces 30 and 31 as shown in FIG. 1, may be calculated analytically as discussed below.

Low Reynolds number flow implies that the Stokes equation governs the flow:

$$\Delta P = -\mu \Delta^2 U$$

For flow between parallel plates in a primary flow direction along the x axis shown in FIG. 1, $$U_{avg} = \frac{ab}{\mu}\left(-\frac{\partial P}{\partial x}\right)F(a/b)$$

where a is half the width of the channel, b is half the height of the channel, and F(a/b) is a geometrical factor as described in Longwell, supra.

The total pressure drop in the channel along the length L is:

$$\Delta P = \frac{2U_{avg}\mu L}{abF(2a/b)}$$

The channel is divided into two equal parts by the beam 20. The pressure drop in the divided channel is $$\Delta P_d = \frac{2U_{avg}\mu L}{abF(2a/b)}$$

Due to the angle of the beam, F is a function of x. Pressure is then a function of x in each of the divided flow portions $U_1$ and $U_2$ of the channel, and is found by integrating the pressure gradient along the length, L, of the channel. Specifically, for the pressure $P_1$ in portion $U_1$ of the channel:

$$P_1(x) = -\frac{\left(a + \frac{mL}{2}\right)}{L} \frac{\frac{L}{2} + x}{a + mx} P_0$$

where m is the slope of the beam surfaces with respect to a parallel to the primary direction of flow and $P_0$ is the total pressure drop.

$P_2$ can be found in a similar manner. Taking the difference in $P_1$ and $P_2$ and integrating, we can find the net force acting on the beam and the moment thereof as:

$$F = \frac{4bP_0}{m}\left[a - \frac{1}{mL}\left(a^2 - \frac{m^2L^2}{4}\right)\log\left(\frac{a + \frac{mL}{2}}{a - \frac{mL}{2}}\right)\right]$$

Figure 2:
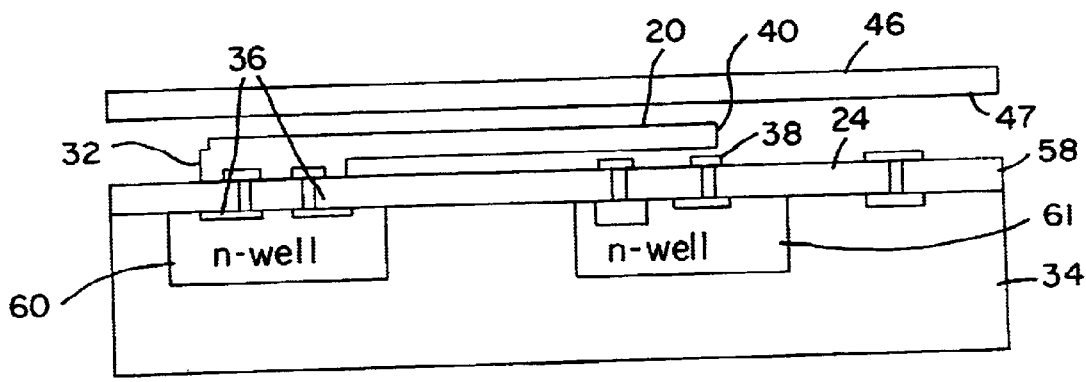
FIG. 2 is a partial cross-sectional view of the flow sensing apparatus of FIG. 1 taken generally along the lines 2—2 of FIG. 1.

Examples of means by which the deflection of the beam 20 may be detected are illustrated in FIGS. 1 and 2. The torque applied by the beam 20 through its mount 32 to a substrate 34 (the surface of which forms the bottom wall 24) may be sensed by sensing the strain in the substrate utilizing strain sensors 36, such as piezoresistors, which are formed in the substrate adjacent to or under the mount 32. The piezoresistors may be electrically connected together in a Wheatstone bridge configuration to allow low noise readout of the strain applied to the substrate. Another or an additional manner of detecting the deflection of the beam can include photodiodes 38 and 39 which are formed under the cantilever beam 20 such that a portion of the beam blocks a portion of light from being incident on the photodiodes 38 and 39, with the amount of deflection of the beam 20, and particularly the free end 40 of the beam, being sensed as more or less of the photodiodes 38 and 39 are covered (or uncovered) by the beam 20 as it deflects.

The primary direction of flow of fluid in the channel 21 is represented by the arrows 41 and 42 in FIG. 1, and such direction is generally parallel to the parallel side walls 22 and 23 of the channel 21 in FIG. 1, although it is understood that the walls of the channel may not necessarily be straight or parallel to one another, and that the path of fluid does not necessarily have to be confined by side walls to the channel. The surfaces 30 and 31 of the cantilever beam 20 are preferably flat and parallel to one another (although they need not necessarily be so), and the beam 20 is mounted via the mounting post 32 to the substrate with its surfaces 30 and 31 at an angle off of parallel to the primary direction of flow in the channel, as illustrated in FIG. 1. The beam may extend upstream or downstream from the mount, typically downstream. Generally, the angle between a parallel to the primary direction of flow and the surfaces 30 and 31 of the beam may be in the range of 2° to 45°, and preferably 5° to 20°, although greater and lesser angles may be utilized. Very large angles will result in obstruction to flow, while very small angles result in lower sensitivity.

As illustrated in the side view of FIG. 2, the cantilever beam 20 is mounted by the post 32 to the substrate at a position spaced above the surface of the bottom wall 24 of the substrate so that the cantilever beam 20 can freely deflect without interference from contact with the substrate. As also shown in FIG. 2, a cover 46 may be mounted above the cantilever beam 20 to completely confine the flowing fluid within the channel defined by the side walls 21 and 22, the bottom wall 24 and a surface 47 of the cover 46 which forms the top wall of the channel. As fluid flows past the off-angle mounted cantilever beam 20, a differential drag force is applied to the beam 20, tending to deflect the beam in a direction further away from a parallel to the primary direction of flow, i.e., in a counterclockwise direction for the cantilever beam 20 shown in FIG. 1. The differential drag force may be transmitted by the beam entirely to the mounting post 32 and thence to the substrate 34, imposing a strain on the substrate underneath the position at which the beam 20 is mounted to the substrate. For a sufficiently thick and stiff beam 20, the beam itself may undergo substantially no bending and will transmit all of the differential drag forces as a torque applied through the mounting post 32 to the substrate. For example, the beam may be formed of very stiff materials that do not readily bend, such as metals, or of low stiffness materials such as elastomers that will readily bend elastically. When the rate of flow diminishes, the differential drag force on the cantilever beam similarly diminishes and the cantilever beam 20 is resiliently (elastically) returned to its initial position as the strain in the substrate is elastically released. The beam 20 may also be sufficiently thin and of a material such that the beam 20 itself will bend or curve as a result of the differential drag forces across the beam while imposing little strain on the substrate. In that case, the beam 20 will again resiliently return to its initial position as the flow rate decreases by virtue of the elastic restoring force of the beam which is bent in elastic deformation. The beam 20 may both bend and apply a torque to the substrate that tends to pivot the beam about the mount 20. For all of these cases, the result is a deflection of the beam away from its initial position, and most particularly a deflection of the free end 40 of the beam away from its initial position. This deflection may be detected by various means, with the amount of deflection being generally proportional to the rate of flow in the channel.

Figure 3:
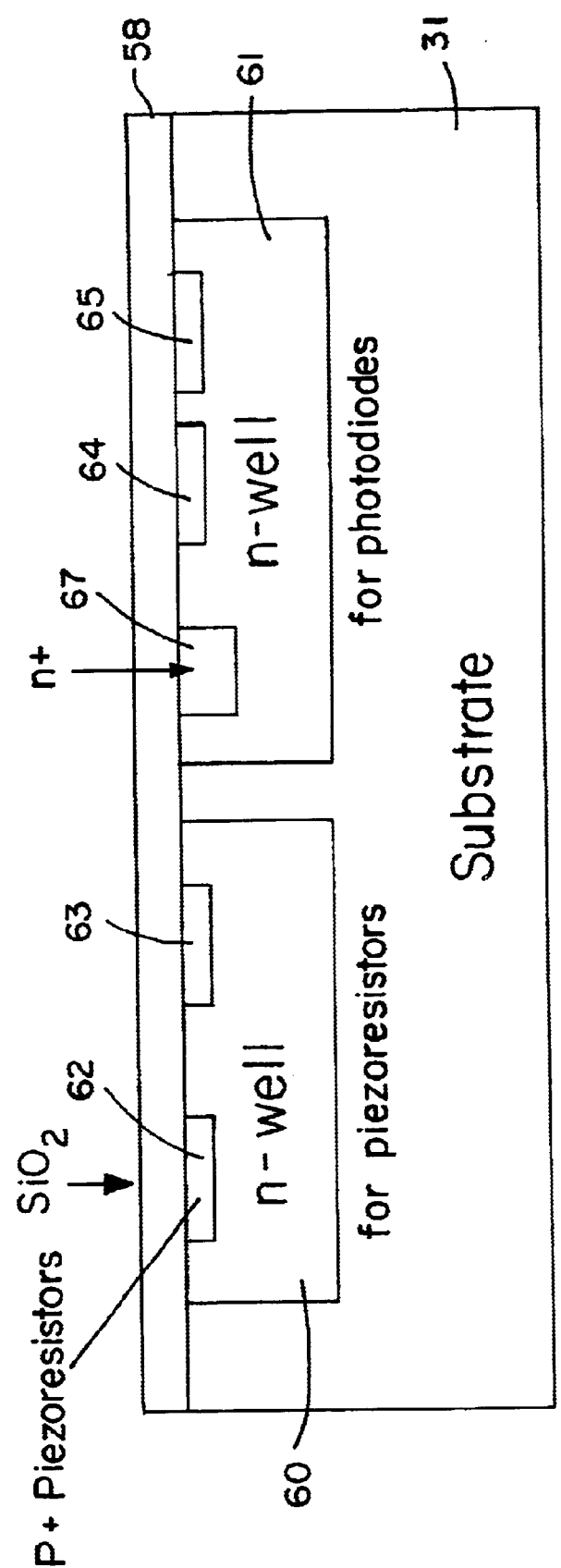
FIG. 3 is a cross-sectional view showing an initial step in the processing for forming the piezoresistors and photodiodes illustrated in FIG. 2.
Figure 4:
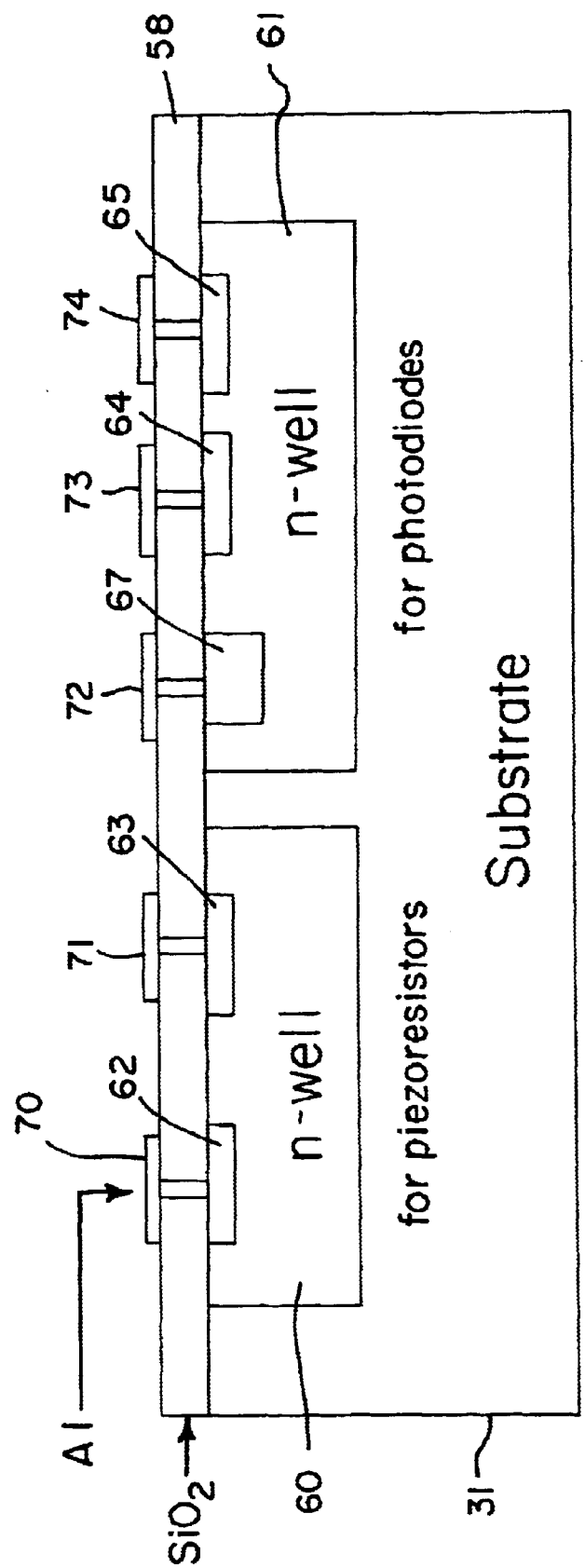
FIG. 4 is a cross-sectional view similar to FIG. 3 illustrating a further step in the processing.

A significant advantage of the present invention is that means for detecting the deflection of the cantilever beam may be formed by microelectronic processing techniques in the substrate itself. This is illustrated for exemplification in FIG. 2, in which the mount 32 for the cantilever is formed on an electrical insulation layer 58, e.g., $SiO_2$ or silicon nitride on a substrate 32 formed of crystalline silicon. An n-type implant in a well region 60 beneath the mount 32 for the cantilever may be utilized for forming the piezoresistors 36, whereas another n-type well 61 under the cantilever beam 20 may be utilized for forming the photodiodes 38, 39 (and additional photodiodes, as desired). The processing is illustrated with respect to FIGS. 3–5. As shown in FIG. 3, the processing includes implants to create the n-type wells 60 and 61 followed by implants for forming p+ regions 62 and 63 in the well region 60 for the piezoresistors 36, and p+ regions 64 and 65 in the n-type well 61 for the pn diodes 38, 39. An n+ region 67 is implanted in the n-type well 61 as an n contact for the pn diodes, and an oxide layer 58 is then grown for isolation. As shown in FIG. 4, contact holes are etched in the $SiO_2$ layer 58 and aluminum is sputtered to form contacts 70 and 71 for the piezoresistors, and to form contacts 72, 73 and 74 for the photodiodes. Suitable conductors may then be connected to the contacts 70–74 which lead out through the channel to an external connection. For example, the conductors may be formed as metal strips on the $SiO_2$ layer 58 which may then covered with insulator, similar to electrical interconnects for printed circuits.

Figure 5:
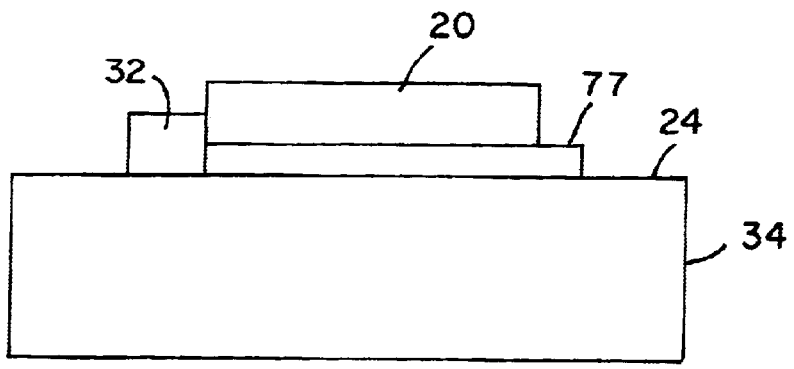
FIG. 5 is a simplified cross-sectional view illustrating an exemplary manner of formation of the cantilever beam for the flow sensing apparatus of FIG. 2.

The cantilever beam 20 may be formed by surface micromachining techniques, an example of which is illustrated with respect to FIG. 5. An initial sacrificial gold layer 77 may be deposited on the surface 24 of the substrate 34, followed by masking and depositing of polysilicon on the substrate to form the mount 32, physically secured to the substrate, and to form the cantilever beam 20, which may be formed integrally with the mount 32. The cantilever beam 20 may then be released by applying an etchant which etches away the sacrificial gold layer 77 without affecting the surface 24 of the substrate, the mount 32, or the cantilever beam 20. Of course, the beam and other structures may be formed by other materials, as desired, e.g., electroplated nickel, Su8, polymethylmethacrylate (PMMA), etc.

In an example of the processing described above, the n-well implants may be carried out utilizing phosphorous as the dopant, followed by an anneal cycle, e.g., of one hour at 1050° C. The p+ implant may be carried out utilizing boron, followed again by the n+ implant with phosphorous, followed by wet oxidation, e.g., at 980° C. for 45 minutes.

Because all of the parts in the channel may be formed on the surface of the channel, and the leads may be carried out through the channel or through side walls, if desired, the cover 46 with its surface 47 defining the top wall of the channel may be formed of any desired material, including materials completely different from the material of the substrate 34. For example, many polymer materials may be utilized to form the cover, such as polydimethylsiloxane (PDMS). A variety of other structures may be formed in or on the substrate or on the walls of the channel, as desired, for various purposes.

Figure 7:
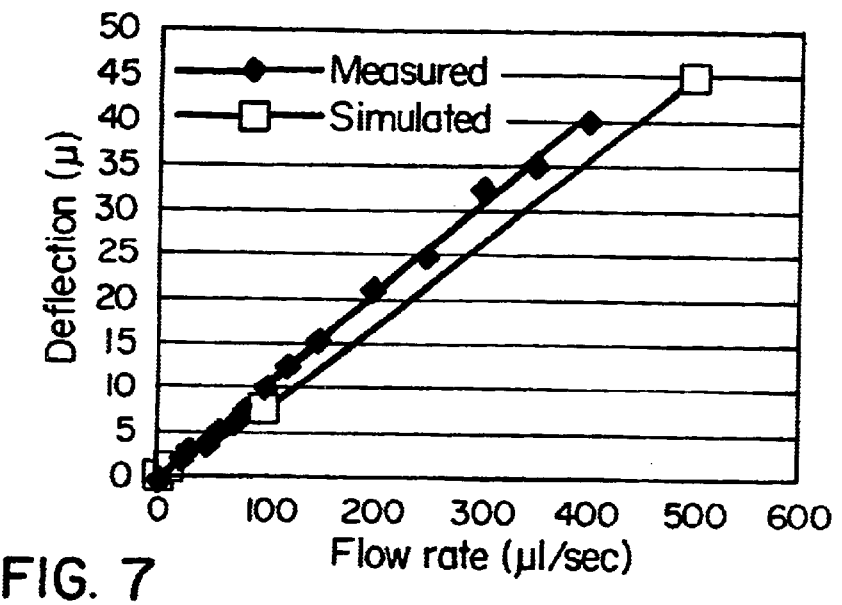
FIG. 7 is a graph illustrating beam deflection versus flow rate for both a simulated flow sensing apparatus and for a physical flow sensing apparatus embodying the simulated structure.
Figure 6:
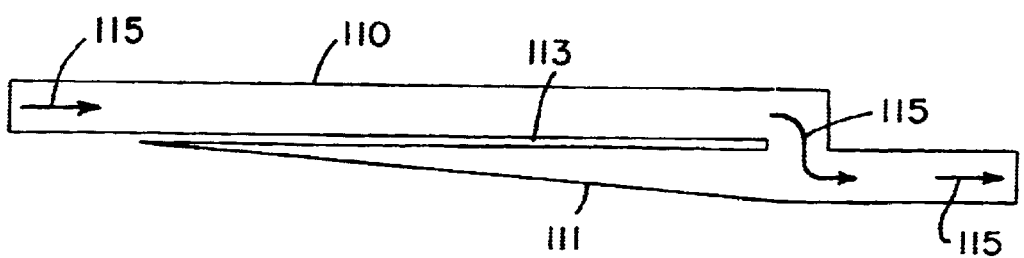
FIG. 6 is a plan view of a microfluidic flow channel flow sensing apparatus for carrying out investigations of flow sensing in accordance with the invention.

For purposes of exemplifying the invention, a flow channel structure was formed as shown in FIG. 6 having channel walls 110 and 111. A cantilever beam 113 extends outwardly from the wall 111. Because the channel walls 110 and 111 are not parallel to one another, the primary direction of flow of fluid through the channel, as illustrated by the arrows 115, is bent, rather than straight. It is understood that the present invention encompasses channels formed with various geometries, including those in which the channel walls are not parallel to one another, or structures in which flow is confined without utilizing channel side walls. As illustrated in FIG. 6, the cantilever beam 113 is mounted initially at an angle with respect to the primary direction of flow 115 of the fluid in the channel. Exemplary devices having the structure of FIG. 6 were formed with beams formed of plastic made by stereolithography (SLA), Becton Dickinson Corporation. The SLA fabricated beams were 500 µm in height, 160 µm thick, and had lengths ranging from 2.3 mm to 13.9 mm. The design of the channel and the beams allowed view of the beams such that the deflections could be optically measured, differentially or absolutely, using internal or external photodiodes or optical equipment. FIG. 7 shows graphs illustrating measured values of deflections of a beam of dimensions 7 mm length×160 µm thickness and calculated values of a simulation of deflections for the same beam and channel dimensions. According to the model, the sensitivity of the device is found to be proportional to (beam-length/beam-width)$^3$, an indication of beam stiffness and drag length. This feature was also verified by simulations and by measuring the sensitivity of beams of different lengths.

Figure 8:
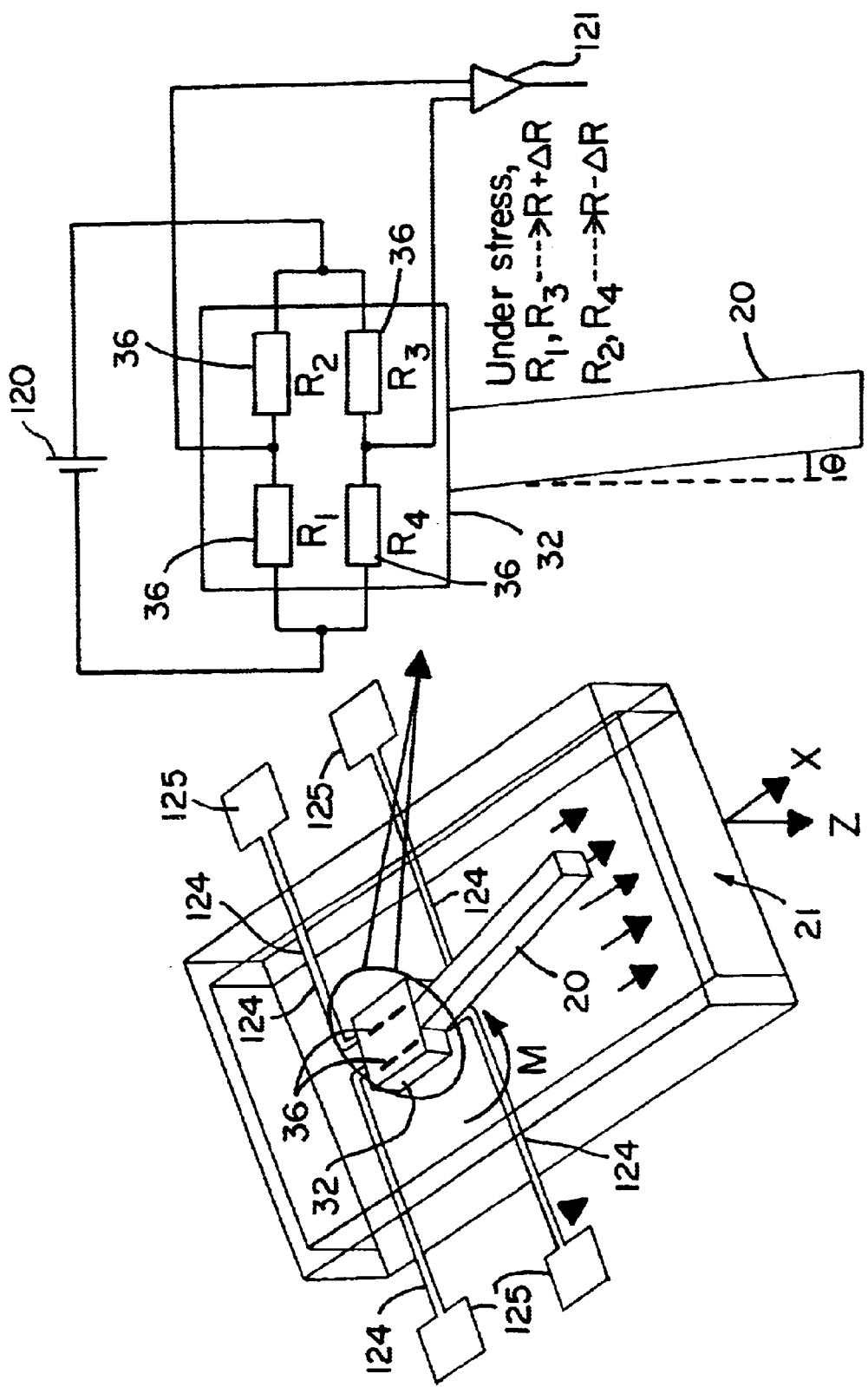
FIG. 8 is diagrammatic view illustrating the electrical connection of piezoresistors in the flow sensing apparatus.

FIG. 8 schematically illustrates the manner in which the piezoresistors 36 may be connected in a Wheatstone bridge configuration, with a voltage applied to the bridge from a source 120 and the output of the bridge supplied to an amplifier 121 which provides the output signal related to flow rate. Conductors 124 may extend on the surface of the bottom wall of the channel as shown in FIGS. 8 and 9. The conductors 124 may terminate in connection pads 125, which may be formed at positions outside the channel 21.

It is understood that the invention is not confined to the particular embodiments set forth herein as illustrative, but embraces all such forms thereof as come within the scope of the following claims.

What is claimed is:

1. Microfluidic flow sensing apparatus comprising:
   (a) a channel formed to guide flow of a fluid therethrough in a primary direction of flow with lateral dimensions of the flow of 500 µm or less; and
   (b) an elongated beam having opposite surfaces cantilever mounted at a one end of the beam to a wall of the channel and contained within the channel with the surfaces of the beam oriented at an angle between 2° and 45° off of parallel to the primary direction of flow of fluid in the channel, the beam responsive to differential drag forces on the beam imposed by fluid flowing through the channel in the primary direction of flow to deflect toward an upstream direction of the flowing fluid.

2. The apparatus of claim 1 including strain sensors formed in the wall of the channel to which the beam is mounted adjacent to the position at which the beam is mounted to the wall to sense strain in the wall caused by pivoting of the beam about its position of mounting to the wall of the channel.

3. The apparatus of claim 2 wherein the strain sensors comprise piezoresistors.

4. The apparatus of claim 3 wherein the piezoresistors are electrically connected in a Wheatstone bridge configuration.

5. The apparatus of claim 1 including photodiodes formed in the wall of the channel to which the beam is mounted at a position beneath a portion of the beam such that the beam partially blocks light incident on the photodiodes when the beam is not deflected and blocks more or less light incident on the photodiodes as the beam is deflected.

6. The apparatus of claim 1 wherein the opposite surfaces of the beam are flat and parallel to one another.

7. The apparatus of claim 6 wherein the thickness of the beam between the parallel surfaces of the beam is less than 200 µm and wherein the length of the beam between the end at which the beam is mounted to the wall of the channel and an opposite end of the beam is at least 10 times the thickness of the beam.

8. The apparatus of claim 1 wherein the channel is formed on substrate of crystalline silicon.

9. The apparatus of claim 8 wherein the beam is formed of polysilicon that has been deposited onto the surface of the wall to which the beam is mounted.

10. The apparatus of claim 1 wherein the beam is mounted to the wall of the channel with the surfaces of the beam at an angle between 5° and 20° to the primary direction of flow of fluid in the channel.

11. Microfluidic flow sensing apparatus comprising:
    (a) a substrate having a channel formed therein defined by side walls and a bottom wall;
    (b) a cover on the substrate enclosing the channel and defining a top wall for the channel, the channel formed to guide flow of a fluid therethrough in a primary direction of flow;
    (c) an elongated beam having opposite surfaces cantilever mounted at a one end of the beam to a wall of the channel and contained within the channel with the surfaces of the beam oriented at an angle off of parallel to the primary direction of flow of fluid in the channel; and
    (d) means for detecting deflection of the beam in the channel in response to differential drag forces on the beam imposed by fluid flowing through the channel in the primary direction of flow.

12. The apparatus of claim 11 wherein the means for detecting deflection of the beam comprises strain sensors formed in the wall of the channel to which the beam is mounted adjacent to the position at which the beam is mounted to the wall to sense strain in the wall caused by pivoting of the beam about its position of mounting to the wall of the channel.

13. The apparatus of claim 12 wherein the strain sensors comprise piezoresistors.

14. The apparatus of claim 13 wherein the piezoresistors are electrically connected in a Wheatstone bridge configuration.

15. The apparatus of claim 11 wherein the means for detecting deflection of the beam comprises photodiodes formed in the wall of the channel to which the beam is mounted at a position beneath a portion of the beam such that the beam partially blocks light incident on the photodiodes when the beam is not deflected and blocks more or less light incident on the photodiodes as the beam is deflected.

16. The apparatus of claim 11 wherein the cover is transparent to at least some wavelengths of light and wherein the means for detecting deflection of the beam comprises means for optically detecting deflections of the beam.

17. The apparatus of claim 11 wherein the beam is mounted to the bottom wall of the channel.

18. The apparatus of claim 11 wherein the width of the channel between the side walls is less than 1,000 µm and the height of the channel between the bottom wall and the top wall is less than 1,000 µm.

19. The apparatus of claim 18 wherein the width and height of the channel are each 500 µm or less.

20. The apparatus of claim 18 wherein the opposite surfaces of the beam are flat and parallel to one another.

21. The apparatus of claim 20 wherein the thickness of the beam between the parallel surfaces of the beam is less than 200 µm and wherein the length of the beam between the end at which the beam is mounted to the wall of the channel and an opposite end of the beam is at least 10 times the thickness of the beam.

22. The apparatus of claim 11 wherein the substrate is formed of crystalline silicon and the cover is formed of a different material which is secured to the substrate.

23. The apparatus of claim 22 wherein the cover is formed of a polymer material.

24. The apparatus of claim 22 wherein the beam is formed of polysilicon that has been deposited onto the surface of the wall to which the beam is mounted.

25. The apparatus of claim 11 wherein the beam is mounted to the wall of the channel with the surfaces of the beam at an angle between 5° and 20° to the primary direction of flow of fluid in the channel.

26. A method of sensing microfluidic flow comprising:
  (a) confining and directing a fluid along a surface in a primary direction of flow past a cantilever beam which is mounted at one end of the beam to the surface, the cantilever beam having parallel beam surfaces that are oriented at an angle off parallel to the primary direction of flow of the fluid; and
  (b) directing the fluid past the beam at a rate such that the drag forces on the parallel surfaces of the beam are greater than the inertial forces of the fluid on the beam to deflect the beam toward an upstream direction of the flowing fluid.

27. The method of claim 26 further including the step of detecting the deflection of the beam in response to differential drag forces on the beam imposed by the flowing fluid.

28. The method of claim 27 wherein the step of detecting the deflection of the beam is carried out optically.

29. The method of claim 27 wherein the step of detecting the deflection of the beam is carried out by sensing strain in the surface on which the cantilever beam is mounted imposed by the beam as it is deflected.

30. The method of claim 27 wherein the fluid that is directed past the beam is water or a water based solution.

31. The method of claim 27 wherein the step of directing the fluid past the beam is carried out at a rate such that the fluid flows in a laminar flow.

32. The method of claim 27 wherein the step of confining and directing a fluid is carried out to confine the fluid in a channel having a height and width of 500 µm or less.

33. The method of claim 27 wherein the cantilever beam has flat parallel beam surfaces with a thickness between the beam surfaces of less than 200 µm.

34. The method of claim 33 wherein the beam has a length at least 10 times the thickness of the beam between the surfaces of the beam.

* * * * *